United States Patent [19]
Michel

[11] 3,874,136
[45] Apr. 1, 1975

[54] TELESCOPIC MAST STRUCTURE
[75] Inventor: Lucien P. Michel, Paris, France
[73] Assignee: Scadella Anstalt, Vaduz, Liechtenstein
[22] Filed: June 7, 1973
[21] Appl. No.: 367,893

[30] Foreign Application Priority Data
June 12, 1972 France .............................. 72.20997

[52] U.S. Cl. .................................... 52/115, 52/118
[51] Int. Cl. .............................................. B66f 11/02
[58] Field of Search ............. 52/126, 111, 122, 114, 52/118, 115, 29, 7

[56] References Cited
UNITED STATES PATENTS
| | | | |
|---|---|---|---|
| 1,264,063 | 4/1918 | Guichard | 52/111 X |
| 2,708,493 | 5/1955 | Badertscher et al. | 52/111 X |
| 2,888,111 | 5/1959 | Evans | 52/114 |
| 3,263,382 | 8/1966 | Tourtellotte | 52/111 |
| 3,423,890 | 1/1969 | Leigh | 52/118 |
| 3,587,886 | 6/1971 | Gano et al. | 52/118 X |
| 3,722,154 | 3/1973 | Sakamoto et al. | 52/115 X |

FOREIGN PATENTS OR APPLICATIONS
| | | | |
|---|---|---|---|
| 22,403 | 7/1912 | United Kingdom | 52/115 |
| 1,158,982 | 6/1958 | France | 52/115 |
| 1,005,255 | 3/1957 | Germany | 52/115 |

*Primary Examiner*—Frank L. Abbott
*Assistant Examiner*—Leslie A. Braun
*Attorney, Agent, or Firm*—Finnegan, Henderson, Farabow & Garrett

[57] ABSTRACT

Telescopic mast structure having tubular sections extendible within the other guide units between complementary surfaces of associated telescoped sections, pressurized fluid for extending sections relative to each other, and expansible seal between such complementary surfaces.

3 Claims, 1 Drawing Figure

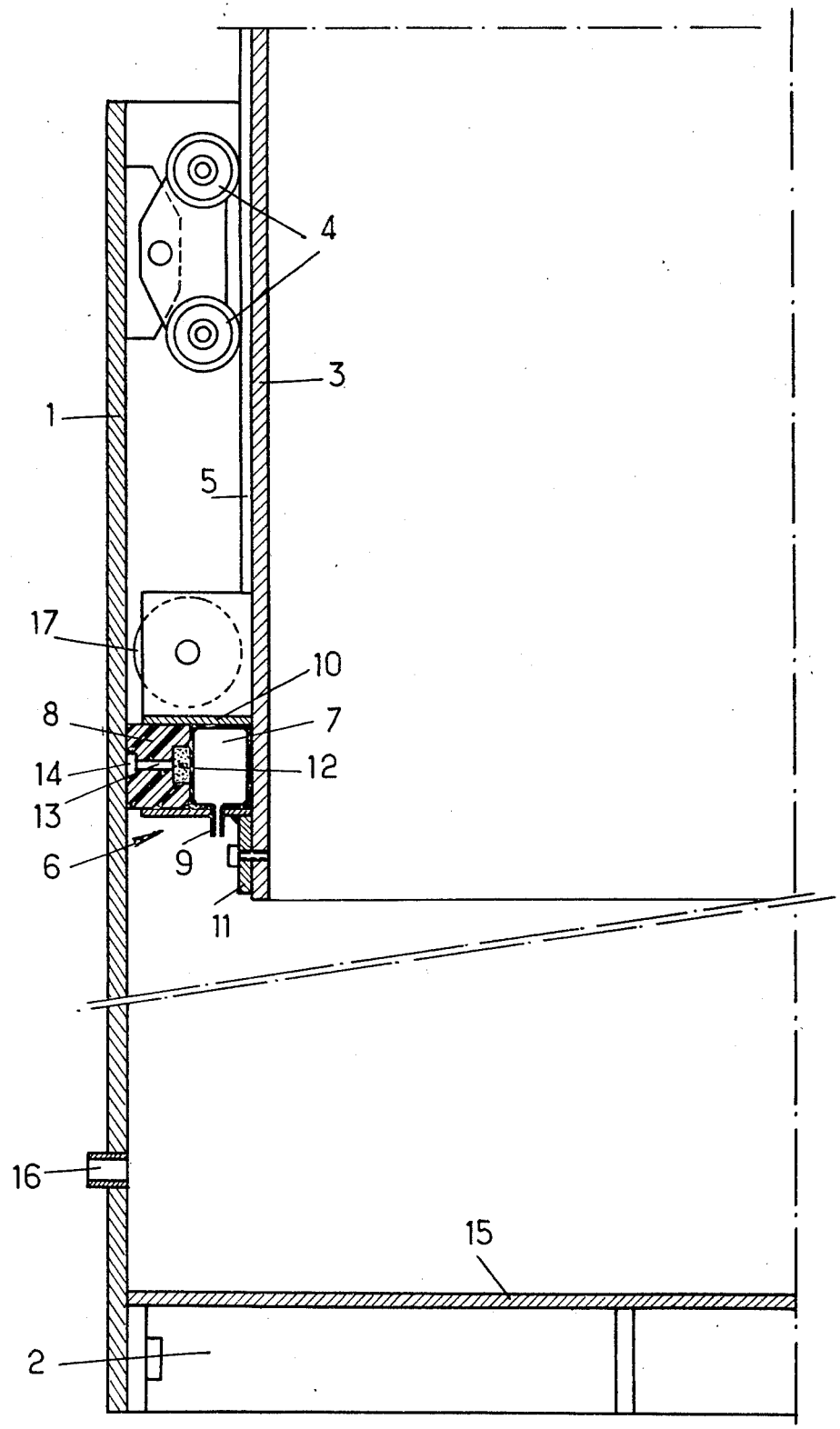

TELESCOPIC MAST STRUCTURE

The present invention concerns telescopic mast structures.

Attempts have been made to form telescopic mast structures from a plurality of tubular sections which can be extended by means of pressure fluids, in particular gases. Such structures require sealing means to contain the pressure fluid and require a high degree of surface finish on the corresponding sliding surfaces. As a result the tubular sections have to be checked and inspected prior to assembly of the structure. These requirements are expensive and the cost of a large structure, for example a structure which can be extended several tens of metres, can become prohibitive. Further structures which are capable of large extensions require large diameter tubular sections and this again adds to the overall costs.

The present invention seeks to overcome the disadvantages in existing telescopic mast structures which are extended by a pressure fluid.

According to the present invention a telescopic mast structure comprises a plurality of tubular sections extendible one within the other, each section having a guide unit adjacent its upper end co-operable with the exterior of its associated inner tubular section and an expansible joint adjacent its lower end co-operable with the interior of its associated outer tubular section and means provided in the outermost tubular section for introducing a fluid under pressure whereby to extend the sections.

Preferably, each guide unit comprises friction rollers co-operable with a roller track arranged on the exterior of the associated inner tubular section.

Conveniently, each expansible joint comprises an annular inflatable chamber extending around the tubular section and surrounded by a peripheral annular resilient sealing member, a lubricant cavity in the sealing member communicating through radial bores with the outer peripheral surface of the sealing member.

As a result telescopic mast structures of any size, and in particular structures capable of large extensions, can be manufactured and assembled in a simple manner and at little cost.

Further the expansible joint enables tubular sections to be utilised which hitherto were considered unacceptable on account of irregular tolerances and surface conditions.

Preferably the inflatable chamber and the sealing member are secured about the tube between two flanges on the tube, at least one of the flanges being detachable. This facilitates maintenance and renewal of the structure and an inspection entrance can be provided in the outermost tube of the structure.

Preferably, secondary guide rollers are provided adjacent the lower end of each tubular section. These secondary guide rollers can serve to bear stresses exerted on the wall of the associated tubular section in the event of excessive compression of the expansible joint.

The invention will be described further, by way of example, with reference to the accompanying drawing which shows, diagrammatically, a simplified section of a portion of a telescopic mast.

A telescopic mast comprises a plurality of tubular cylindrical sections fitting one into the other. In the drawing only, the first tube 1 of the series, that is the outermost tube having the largest diameter and the next intermediate tube 3 are shown. The lower part 2 of the tube 1 forms a support for the mast.

A guide unit is mounted internally adjacent the upper end of each tubular section of the mast. In the illustrated example the guide unit comprises friction rollers 4 co-operable with a roller track 5 arranged on the exterior of the associated tube 3. The last tube of the series, that is the tube of smallest diameter which forms the innermost section of the mast, is not provided with such a guide unit and its upper end is sealed in a fluid-tight manner.

With the exception of the outermost tube 1, each tube of the series is provided with an expansible joint 6 adjacent its lower end, the joint 6 co-operating with the inner surface of the associated outer tube of the series. The joint 6 comprises an annular air chamber 7 extending around the tube 3 which in turn is surrounded by a resilient sealing member 8. The member 8 can be formed from rubber or a plastics material. The air chamber 7 is provided with an inflation valve 9 and the chamber 7 together with the sealing member 8 are maintained in position about the tube 3 between a fixed flange 10 and a detachable flange 11.

The sealing member 8 is formed with an annular internal cavity 12 which is filled with a lubricant such as a grease on assembly of the mast. The cavity 12 communicates with the outer periphery of the sealing member 8 by way of a plurality of radial bores 13. The sealing member 8 is in contact with the inner surface of the associated outer tube. The bores 13 terminate in an annular groove 14 formed in the outer surface of the sealing member 8 and which serves to provide a substantially uniform supply of lubricant about the complete periphery of the sealing member. As mentioned above and as seen from the drawing the innermost tube 1 of the series is not provided with an expansible joint. The bottom of the tube 1 is sealed in a fluid-tight manner by a plate 15. An inlet 16 through the wall of the tube 1 enables a fluid under pressure, for example compressed air, to be introduced by means not shown into the bottom of the mast structure.

Secondary friction guide rollers 17 are mounted on each tube immediately above the joint 6. The rollers 17 do not normally bear against the interior of the associated outer tube and serve merely to absorb stresses arising in the wall of the outer tube in the event of excessive compression of the joint 6 about a part of its periphery.

it will be seen that the joints 6, which can expand and contract, provide excellent seals within the mast structure irrespective of the condition of and possible distortions in the tube surfaces. Upon installation the diameter of the sealing member 8 is slightly less than the nominal internal diameter of its associated outer tube. The chamber 7 is then inflated to a pressure at which the sealing member 8 bears at an appropriate required pressure against the internal wall of the associated outer tube.

The air chamber 7 which is elastically deformable urges the grease contained in the annular cavity 12 through the bores 13 to the outer peripheral surface of the sealing member 8 thus ensuring effective lubrication in the course of operation. Suitable choice of the consistency of the lubricant and the diameter or number of the radial bores 13 serves to control the rate of distribution of the lubricants. The internal walls of the tubes can be coated with lubricant during installation.

The joints 6 ensure the acceptance of the stresses exerted by the lower part of each of the tubes on the associated outer tube. In addition the joints 6 in conjunction with the friction rollers 4 ensure that the tubes are centered and guided one within the other. Further the rollers 4 and the co-operating tracks 5 serve to prevent relative rotation between the tubes. This can be useful in certain practical applications of the mast structure.

The arrangement described above enables the construction of large telescopic structures which can be extended readily by introducing pressure fluid at the inlet port 16. The structure can be formed from tubes which are not required to be manufactured to close tolerances and this results in a reduction in cost. For example, the structure can be constructed from pipeline tubing.

As a result of the detachable flanges 11 the maintenance and renewal of the joints 6 can be performed readily without complete dismantling of the structure. An inspection trap can be provided in the tube 1 and this trap (not shown in the drawing) can, dependent on the size of the structure, be a man-hole.

I claim:

1. A telescopic mast structure comprising a plurality of tubular sections extendible one within the other, a guide unit adjacent one end of each section co-operable with a complementary surface of an associated tubular section, an expansible sealing joint adjacent the opposite end of each section and likewise co-operable with a complementary surface of an associated tubular section and means for introducing fluid under pressure into tubular sections whereby to extend and erect the structure, each expansible joint comprising an annular inflatable chamber extending around the tubular section, an annular resilient sealing member extending about the periphery of the inflatable chamber, and a lubricant cavity in the sealing member communicating through radial bores with the outer peripheral surface of the sealing member.

2. A telescopic mast structure according to claim 1, including two axially spaced flanges on the tubular section for containing the inflatable chamber and the resilient sealing member, at least one of the flanges being detachable.

3. A telescopic mast structure according to claim 1, and secondary guide rollers arranged adjacent the lower end of each tubular section and which normally do not bear against the interior of the associated outer tubular section but are arranged to absorb stresses in the wall of said outer section whenever said expansible joint is compressed beyond a predetermined amount.

* * * * *